(12) United States Patent
Bernhard et al.

(10) Patent No.: US 9,717,304 B2
(45) Date of Patent: Aug. 1, 2017

(54) SOLE FOR A FLEXIBLE SHOE

(71) Applicant: On Clouds GmbH, Heiden (CH)

(72) Inventors: Olivier Bernhard, Heiden (CH);
Ilmarin Heitz, Zurich (CH)

(73) Assignee: ON CLOUDS GMBH (CH)

( * ) Notice: Subject to any disclaimer, the term of this patent is extended or adjusted under 35 U.S.C. 154(b) by 381 days.

(21) Appl. No.: 14/592,687

(22) Filed: Jan. 8, 2015

(65) Prior Publication Data
US 2015/0230549 A1 Aug. 20, 2015

(30) Foreign Application Priority Data

Feb. 19, 2014 (CH) .......................................... 222/14

(51) Int. Cl.
| | | |
|---|---|---|
| *A43B 13/20* | (2006.01) | |
| *A43B 13/22* | (2006.01) | |
| *A43B 5/06* | (2006.01) | |
| *A43B 13/18* | (2006.01) | |
| *A43B 13/14* | (2006.01) | |

(52) U.S. Cl.
CPC .............. *A43B 13/223* (2013.01); *A43B 5/06* (2013.01); *A43B 13/141* (2013.01); *A43B 13/181* (2013.01); *A43B 13/20* (2013.01); *A43B 13/206* (2013.01)

(58) Field of Classification Search
CPC ... A43B 13/206; A43B 13/181; A43B 13/145; A43B 13/223; A43B 13/141; A43B 13/201
See application file for complete search history.

(56) References Cited

U.S. PATENT DOCUMENTS

| | | | | |
|---|---|---|---|---|
| 3,719,965 A | * | 3/1973 | Chevallereau | A43B 13/206 12/146 B |
| 4,130,947 A | * | 12/1978 | Denu | A43B 13/223 36/30 R |
| 5,461,800 A | * | 10/1995 | Luthi | A43B 13/181 36/114 |
| 6,769,202 B1 | * | 8/2004 | Luthi | A43B 13/184 36/28 |

(Continued)

FOREIGN PATENT DOCUMENTS

| | | |
|---|---|---|
| DE | 202012010878 U1 | 11/2012 |
| WO | 03103430 A1 | 12/2003 |
| WO | 2008115743 A1 | 9/2008 |

*Primary Examiner* — Ted Kavanaugh
(74) *Attorney, Agent, or Firm* — Polsinelli PC (57) ABSTRACT

In a sole for a flexible shoe having a soft-elastic midsole which comes in contact with the ground at least partially during running, which has laterally open, trough-shaped elements which project downwards towards the ground and which are aligned transversely to the longitudinal direction thereof, a midsole is divided into a medial and a lateral part by a longitudinal slot extending from the heel into the ball region. The midsole can have an edge strip which bridges the trough-shaped elements in each case. The midsole is covered by an incompressible but elastically resilient plate framed by the edge strip and that the trough-shaped elements are deformable as far as closure of the lateral openings thereof in the region of the edge strip under the action of forces acting vertically and/or in the longitudinal direction which occur during running.

21 Claims, 5 Drawing Sheets

(56) References Cited

U.S. PATENT DOCUMENTS

| | | | |
|---|---|---|---|
| 7,430,817 B2* | 10/2008 | Abadjian | A43B 13/141 36/102 |
| D675,002 S * | 1/2013 | Marvin | D2/951 |
| D682,522 S * | 5/2013 | Raysse | D2/951 |
| 9,320,317 B2* | 4/2016 | Bernhard | A43B 13/181 |
| 2004/0194343 A1* | 10/2004 | Kim | A43B 7/08 36/29 |
| 2005/0076536 A1 | 4/2005 | Hatfield et al. | |
| 2005/0252038 A1* | 11/2005 | Braunschweiler | A43B 3/24 36/28 |
| 2007/0193065 A1 | 8/2007 | Nishiwaki et al. | |
| 2008/0289224 A1* | 11/2008 | Sink | A43B 13/145 36/103 |
| 2009/0013558 A1* | 1/2009 | Hazenberg | A43B 13/141 36/88 |
| 2011/0016749 A1 | 1/2011 | Callahan et al. | |

* cited by examiner

SOLE FOR A FLEXIBLE SHOE

CROSS REFERENCE TO RELATED APPLICATION

This application claims priority to Switzerland Application No. 00222/24, filed Feb. 19, 2014, the contents of which are entirely incorporated by reference herein.

FIELD

The present disclosure relates to athletic footwear, and more specifically a sole for an athletic shoe.

BACKGROUND

Flexible shoes having various sole constructions are known. However, there is room for improvement in the art.

BRIEF DESCRIPTION OF THE DRAWINGS

Implementations of the present disclosure will now be described, by way of example only, with reference to the attached figures, wherein.

DETAILED DESCRIPTION

At least one embodiment of the present disclosure is a sole for a flexible shoe having a soft-elastic midsole which comes in contact with the ground at least partially during running, and which has laterally open, trough-shaped elements which project downwards towards the ground and which are aligned transversely to the longitudinal direction thereof.

At least one embodiment of the present disclosure is a sole characterized in that the midsole thereof is divided into a medial and a lateral part by a longitudinal slot extending from the heel into the ball region, that the midsole has an edge strip which bridges the trough-shaped elements in each case, that the midsole is covered by an incompressible but elastically resilient plate framed by the edge strip and that the trough-shaped elements are deformable as far as closure of the lateral openings thereof in the region of the edge strip under the action of forces acting vertically and/or in the longitudinal direction which occur during running.

In at least one embodiment, the longitudinal slot can be slightly open towards the outside so that, for example, stones can be less easily trapped therein. Additionally, the midsole can be manufactured efficiently in one piece by injection molding. As a result of the longitudinal slot, trough-shaped elements disposed adjacent to one another in the transverse direction are obtained which are deformable independently of one another and enable a favorable rolling behavior of the foot over the sole. A reinforcement of the trough-shaped elements is obtained on the outside due to the edge strip. The incompressible but elastically resilient plate framed by the edge strip stiffens the midsole, where the plate substantially determines the integral elastic flexibility of the sole. The rather local elastic flexibility is determined by the trough-shaped elements of the midsole.

In at least one embodiment, the sole and the entire shoe can be manufactured with a comparatively very low weight.

In at least one embodiment, the edge strip with its upper edge ends with the upper side of the incompressible but elastically resilient plate at the same height. In this respect the edge strip projects upwards somewhat beyond the level of the trough-shaped elements. The upper part of the shoe can thereby be adhesively bonded in a step-less stable manner both with the plate and with the edge strip.

In at least one embodiment, the plate is configured to be thin, in order to achieve a favorable thickness the edge strip can engage downwards to some extent in the troughs of the trough-shaped elements, whereby the cross-section of the troughs underneath the edge strip and therefore their opening cross-section is somewhat constricted towards the outside by the edge strip.

Upon closure of the lateral openings of the trough-shaped elements under the forces acting during treading, this results in contact between the trough bases and the edge strip underside. As a result, the deformation of the trough-shaped elements is substantially stopped and a firm standing surface is produced for pushing off for the following step. In addition, the horizontal displaceability of the contacting surfaces with respect to one another is hindered by friction, which counteracts the mentioned floating effect. It is favorable for these desired effects if trough-shaped elements are placed down flat due to shearing and in so doing the trough bases come to rest flat on the edge strip underside. This can be achieved by a flat configuration of the trough bases and the edge strip underside, whereby approximately rectangular or trapezoidal cross-sections are obtained for the lateral openings of the trough-shaped elements in the region of the edge strip. In addition, this results in a flat underside of the trough-shaped elements which in turn is favorable for ground contact. The troughs can also be configured to be arcuate, in particular in the ball region, in order to increase their stability. In order that the trough-shaped elements do not hinder each other with this type of deformation, they must have a sufficiently large mutual spacing in the horizontal direction.

In at least one embodiment, on the medial and on the lateral parts the same number, (such as eight of each, for example), of trough-shaped elements aligned with one another in pairs in the transverse direction are provided. Furthermore, the trough-shaped elements can be approximately uniformly distributed in the longitudinal direction.

In at least one embodiment, in order to be adapted to the requirement of a greater damping in the heel region and a firmer standing in the ball region, the thickness of the midsole and therefore of the trough-shaped elements can be configured to be tendentially decreasing from the heel region to the ball region.

In at least one embodiment, the tilting of the foot with rotation about a horizontal axis during rolling over can be taken into account whereby the thickness of at least the rearmost trough-shaped elements is medially greater than laterally.

In at least one embodiment, the greater forces acting on the heel region during treading than during rolling over the metatarsal region and when pushing off with the ball region can be taken into account by a wall thickness of the trough-shaped elements decreasing from the heel region to the ball region for approximately the same outer width of the trough-shaped elements in the longitudinal direction. In view of the mostly differently directed ground reaction forces during treading, rolling over and pushing off, the trough-shaped elements can be configured to be thicker on the front side than on the rear side with regard to their wall thickness in the heel region and thinner on the front side than on the rear side in the ball region. This supports the desired flat placement of the trough-shaped elements, as far as closure of their lateral openings.

Since substantially vertical forces act and vertical deformations occur during rolling over in the metatarsal region, in at least one embodiment, the front and rear side wall thicknesses of the trough-shaped elements can be configured to be approximately the same thickness here.

In at least one embodiment, the deformation behavior of the trough-shaped elements can be further influenced by the steepness of their flanks. In at least one embodiment, the inner flanks of the trough-shaped elements are configured to be steeper in the heel region than in the ball region, whereby the trough-shaped elements in the heel region can be more easily deformed in the horizontal direction, in particular by a type of shear movement.

For the placement of the rearmost trough-shaped elements as far as closure of their lateral openings it can be favorable if the inner and outer flanks of the rearmost trough-shaped elements when viewed from above are each somewhat inclined towards the rear. This can result in a certain recess of the rear end of the midsole, when viewed from a side.

In at least one embodiment, desired folding points can be obtained by superimposing a plurality of troughs on the front sides of the trough-shaped elements. The desired deformation behavior of the trough-shaped elements is additionally supported with flat placement. These troughs can be particularly effective on the outwardly directed front sides since the greatest forces occur here.

The damping and deformation behavior of the trough-shaped elements also depends on their length in the transverse direction. The length of the respectively adjacently lying elements relative to one another can be influenced by the position of the longitudinal slot. The longitudinal slot can be bent and/or comprise a plurality of longitudinal sections which are laterally offset with respect to one another and/or disposed at an angle with respect to one another. Further the trough-shaped elements in the heel region and in the metatarsal region can be medially shorter than laterally and in the ball region medially longer than laterally. Account is thereby taken of the greatest loading which is usually displaced from laterally in the heel region to medially in the ball region.

The joining of the incompressible plate to the soft-elastic midsole is preferably produced by adhesive bonding. In view of the desired deformation behavior of the trough-shaped elements with a flat placement as far as closure of its lateral openings preferably towards the rear in the heel region, substantially vertically in the metatarsal region and preferably towards the front in the ball region, it is advantageous here if the adhesive bonding between the inner flanks of the trough-shaped elements is performed in each case only over a partial area and specifically in the heel region at a distance from the rear flanks, in the metatarsal region at a distance from the front and the rear flanks, respectively, and in the ball region at a distance from the front flanks.

In order to protect the sole from severe abrasion, the underside at least of the front most and/or the rearmost trough-shaped elements can be provided with a layer made of a hard-elastic material.

The midsole can be manufactured efficiently in one piece by injection molding, or from two parts, substantially separated by the longitudinal slot. The two parts need to be joined together merely, for example, by adhesive techniques, in the heel and in the ball region. In particular, an EVA foam material is possible as material. In this case, the injection-molded part still expands appreciably during its removal from the injection mold. A hardness in the range of 50-65 Shore C is particularly suited as material.

The incompressible but elastically resilient plate discussed above, can be provided with a mesh-like profiling, on its upper side and can further comprise longitudinal ribs, transverse ribs and diagonal ribs. The flexibility of the plate in the transverse direction can also additionally be locally increased by notches which run parallel to the longitudinal ribs.

The incompressible but elastically resilient plate can additionally be provided with a profiling on its underside which comprises a structure complementary to the midsole. This complementary structure results in a certain mechanical toothed structure between the plate and the midsole, which also facilitates its adhesive bonding. In this case, however, the depth of engagement of the profile of the plate in the troughs of the trough-shaped elements and in the longitudinal slot is only small compared with their depth.

Figure 1:
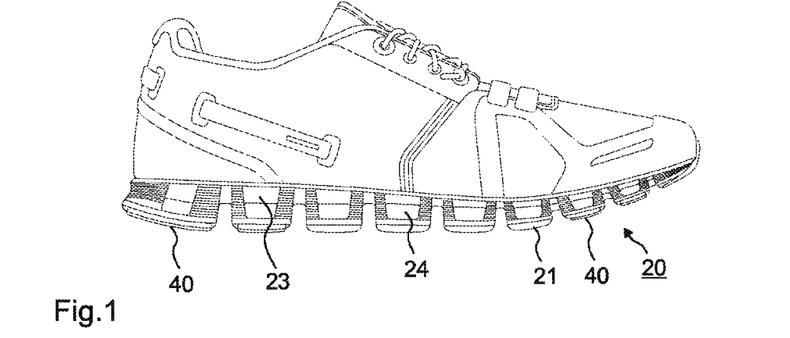
FIG. 1 is a right side elevational view of right shoe with a sole according to the disclosure.

In the shoe shown in FIG. 1, the upper part 10 enclosing the foot and a soft-elastic midsole 20 of a sole are illustrated. By largely dispensing with an outsole, the midsole 20 is partly in direct contact with the ground. In FIG. 1 only the midsole 20 of the sole is visible. In the longitudinal direction of the shoe, the midsole 20 has a plurality of trough-shaped elements 21 extending transversely to the longitudinal direction, which are approximately the same width and distributed approximately uniformly.

As can be identified in FIG. 2 with a view from below onto the tread of the shoe, a longitudinal slot 22 in the midsole 20 extends from the heel region as far as into the ball region approximately over the entire length of the shoe, whereby the midsole 20 is divided into a medial and a lateral part. In at least one embodiment, the medial part and the lateral part can be joined together only at the rear at the end of the shoe and at the front at the tip of the shoe. The longitudinal slot 22 results in pairs of trough-shaped elements 21, disposed adjacent to one another on the lateral side and on the medial side.

Figure 3:
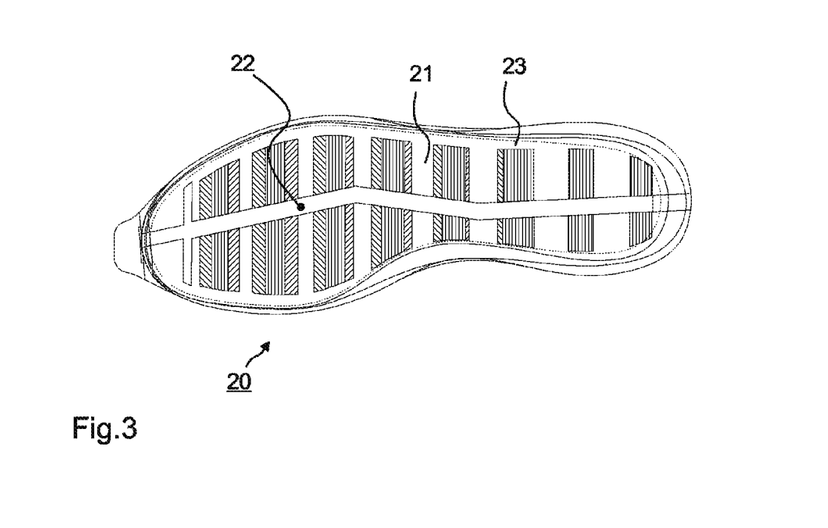
FIG. 3 is a top plan schematic view of the midsole of the shoe from FIG. 1.

FIG. 3 shows the midsole 20 schematically from above, where the longitudinal slot 22 can also be identified since it is vertically continuous in the midsole 20. An edge strip 23 running along the outer edge of the midsole 20 bridges the troughs in the trough-shaped elements 21, leaving lateral openings 24. The lateral inner flanks of the trough-shaped elements 21 are partially obliquely inclined, in particular in the ball region and are merely shown obliquely shaded for the purpose of better identification in FIG. 3. The elevated flat regions between the flanks are vertically shaded in FIG. 3 to distinguish between these.

Figure 4:
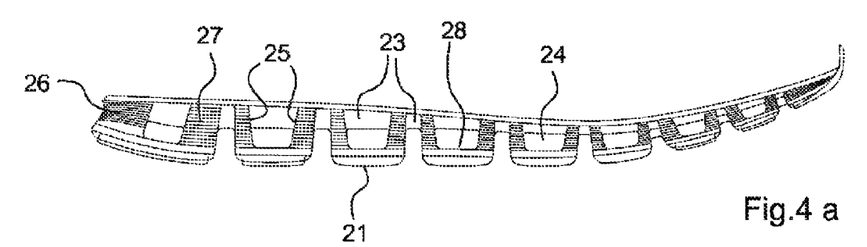
FIG. 4a shows the lateral side of the midsole from FIG. 3.
FIG. 4b shows the medial side of the midsole from FIG. 3.
Figure 5:
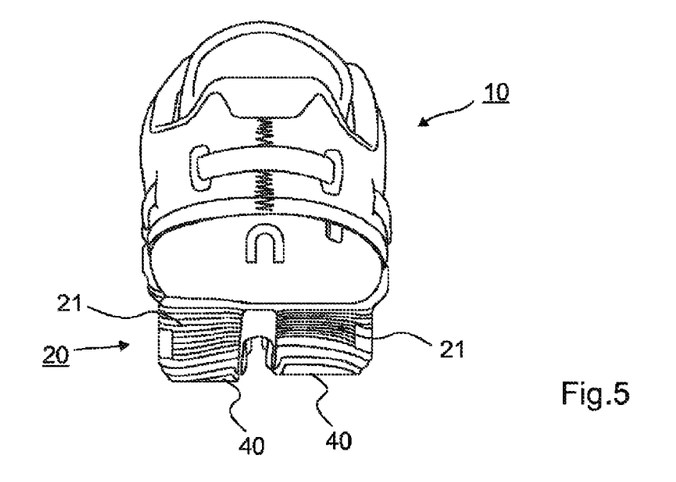
FIG. 5 is a rear elevational view of a right shoe from FIG. 1.

FIG. 4a shows a lateral side view and FIG. 4b shows a medial side view of the midsole 20 by means of which further details of the configuration of the trough-shaped elements 21 become clear. Thus, for example, trough-shaped elements 21 disposed laterally adjacent to one another, for example, have a different cross-sectional shape on the outside, where the lateral openings 24 are, for example, broader laterally than medially. From the heel region to the ball region the thickness of the trough-shaped elements tends to decrease in both views. With the same outer width in the longitudinal direction of the shoe, the wall thickness of the trough-shaped elements 21 decreases from the heel region to the ball region. In the heel region the trough-shaped elements 21 are in addition somewhat thicker on the front side than on the rear side, in the metatarsal region these elements are approximately the same thickness in the front and rear region and in the ball region they are somewhat thinner on the front side than on the rear side. In the heel region the inner flanks 25 of the trough-shaped elements 21 are configured to be steeper than in the ball region and in the rearmost elements 21 are even inclined towards the rear when viewed from above. A recess 26 is present at the rearmost elements 21. On their outwardly directed front sides, the trough-like elements 21 are each provided with a plurality of superposed horizontal grooves 27.

The bases 28 of the trough-shaped elements 21 are each configured to be flat. Together with the edge strip 23 and the inclined flanks 25 of the troughs, approximately trapezoidal cross-sections are thereby obtained for the lateral openings 24. In addition, this results in a flat underside of the trough-shaped elements 21 which is favorable for ground contact. The mutual spacing of the trough-shaped elements 21 in the longitudinal direction of the shoe is selected to be sufficiently large that they are individually deformable by shear in this direction as far as closure of their lateral openings 24 by flat placement.

Figure 6:
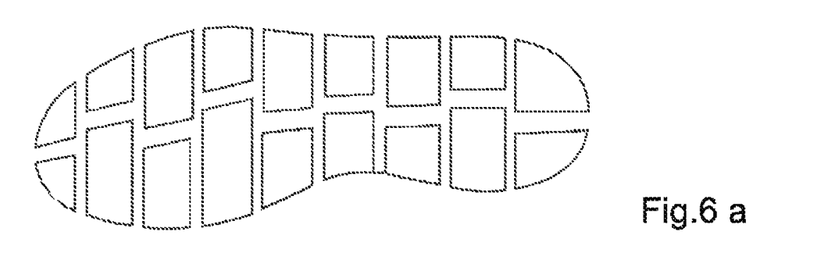
FIGS. 6a-c show different tread geometries of a left shoe.

As can be identified in a rear view of the shoe from FIG. 1 in FIG. 6, the thickness of at least the rearmost medial trough-shaped element 21 is greater than that of the rearmost lateral trough-shaped element 21.

Figure 2:
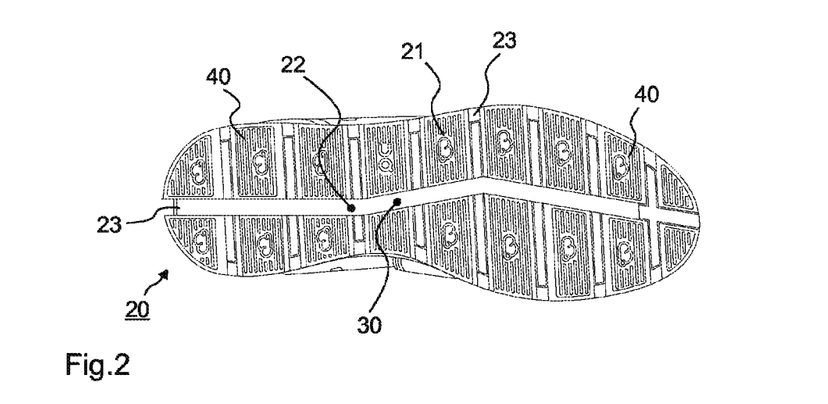
FIG. 2 is a bottom plan view of the shoe from FIG. 1.

In FIGS. 2 and 3 the longitudinal slot 22 is inherently bent and disposed so that the trough-shaped elements in the heel region and metatarsal region are shorter medially than laterally and in the ball region are medially longer than laterally. FIGS. 6a-e shows embodiments where the longitudinal slot comprises a plurality of longitudinal sections which are laterally offset with respect to one another or disposed at an angle with respect to one another. In particular, the rolling over characteristic of the sole can be influenced and adjusted by the shape and position of the longitudinal slot.

The recesses between the trough-shaped elements 21 which are open towards the bottom and the longitudinal slot 22 each expand to some extent downwards which, for example, counteracts the lodging of stones and supports the self-cleaning of the sole.

Figure 7:
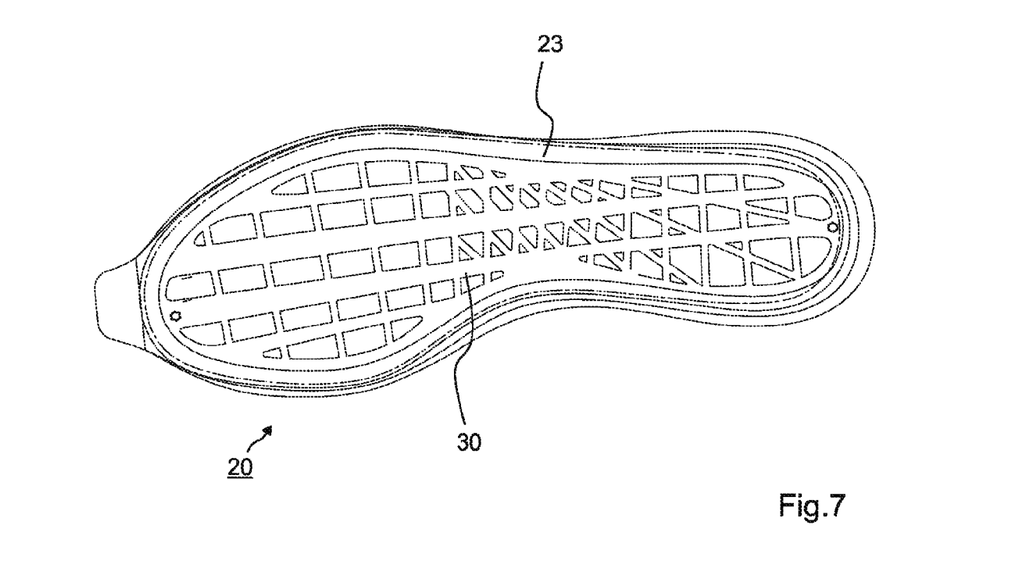
FIG. 7 is a top plan view of a midsole of a right shoe covered with a plate.

At least one embodiment of a sole can comprise a thin, incompressible but elastically resilient plate 30 by which the midsole 20 is covered at the top, as shown in FIG. 7. The plate 30 is fitted into the circumferential edge strip 23 of the midsole 20 and adhesively bonded to this, as will be explained in further detail. Compared with the trough-shaped elements 21, the edge strip 23 is somewhat elevated so that it terminates at the same height as the upper side of the plate 30. The plate 30 engages slightly into the midsole 20, as will be described, whereby the free cross-section of the troughs in the trough-shaped elements 21 is virtually not impaired. In particular, the troughs in the trough-shaped elements 21 are also open inwards towards the longitudinal slot.

The connection of the plate 30 to the soft-elastic midsole is made by adhesive bonding, where the adhesive surfaces 29 are located in the elevated flat regions between the flanks 25 of the trough-shaped elements 21.

Figure 8:
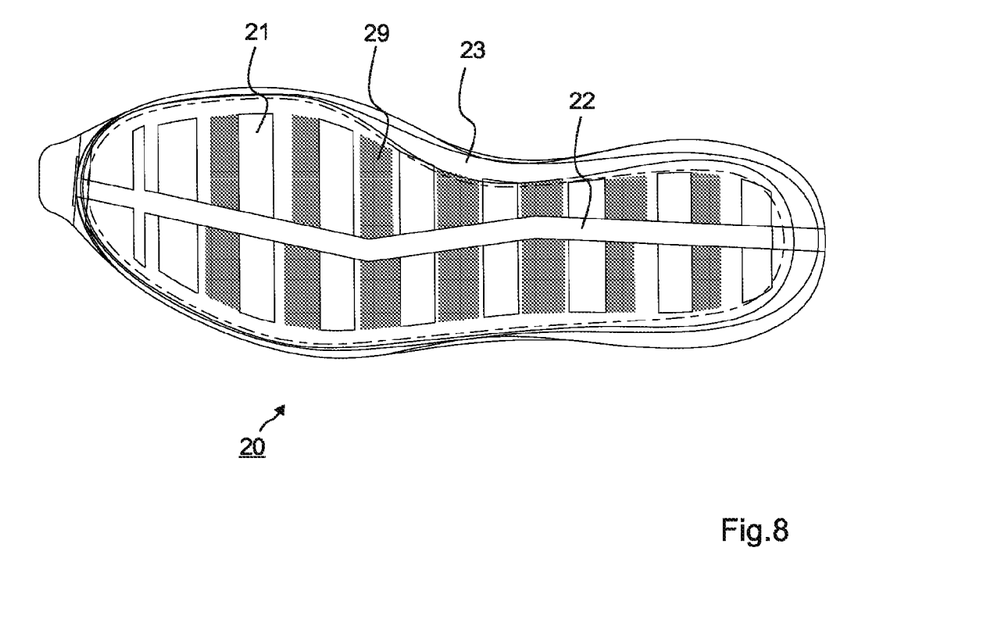
FIG. 8 is a top plan schematic view of a sole of a left shoe.

FIG. 8 shows schematically a plan view of the midsole according to FIG. 3 the adhesive surfaces 29 particularly characterized. The adhesive surfaces 29 in each case are somewhat smaller than the regions between the flanks 25 and disposed so that in the heel region they are at a distance from the rear flanks, in the metatarsal region at a distance from the front and the rear edges in each case and in the ball region at a distance from the front flanks.

Figure 9:
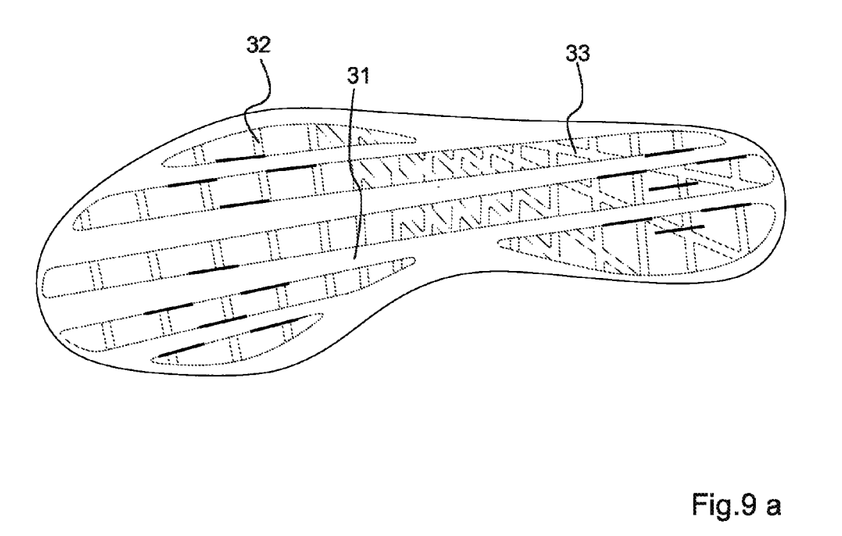
FIG. 9a is a top plan view of plate for covering a midsole of a right shoe
FIG. 9b is a bottom plan view of a plate for covering the midsole of a right shoe.

FIGS. 9a and 9b show the plate 30 for covering the midsole from above and from below, respectively. On both sides the plate 30 is provided with a profiling. On the upper side this profiling comprises longitudinal ribs 31, transverse ribs 32 and diagonal ribs 33. On its underside notches 34 are provided which extend parallel to the longitudinal ribs 31. In addition, the structure of the profiling on the underside with elevated surfaces 36 compared with surfaces 35 is complementary to the structure of the midsole. With this profiling the plate 30 engages to some extent into the troughs of the trough-shaped elements 21 and into the longitudinal slot to form a certain toothed structure. The plate 30 is for example made of polypropylene and even taking into account its profiling is configured to be very thin. The thicknesses lie between only 0.5 mm and 3 mm, where the greater value is only achieved in the overlap regions of front-side ribs 31, 32 or 33 and rear elevated surfaces 36.

To protect the sole against abrasion, the most severely loaded trough-shaped elements 21 in the heel and in the ball region cab be provided with thin-layer supports 40 of a hard-elastic material such as rubber, as is shown in FIG. 2.

In at least one embodiment, the entire shoe is very light. A weight saving is already achieved by largely dispensing with an outsole. As a result of the soft-elastic foam material used for this and its structure with the various troughs and the longitudinal slot, the midsole 20 only contributes about 40-60 grams. The weight of the plate 30 is 20-25 grams. Finally a very thin or mesh-like material can also be used for the upper part 10 since this is not loaded with high forces on account of the high flexibility of the sole. The total weight can thus be kept below 200 grams, for example, in a size corresponding to a U.S. men's 10 or EUR 44.

The invention claimed is:

1. A sole for a flexible shoe having a soft-elastic midsole, wherein the midsole has a metatarsal region, and a medial part and a lateral part proximate a longitudinal slot extending from a heel region into a ball region,
wherein the midsole has a plurality of trough-shaped elements which project downwards towards the ground during normal use of the shoe and which are aligned transversely to a longitudinal direction of the shoe, each of the plurality of the trough-shaped elements having a trough, a cross-section, a lateral opening, an underside, and a base,
wherein the midsole has an edge strip which bridges at least two of the plurality of trough-shaped elements and is covered by an incompressible elastically resilient plate framed by the edge strip, and
wherein the trough-shaped elements are configured to be deformable to close lateral openings thereof in a region of the edge strip when acted upon by vertical forces and when acted upon by forces directed along the longitudinal direction.

2. The sole according to claim 1, wherein an upper edge of the edge strip, and an upper side of the incompressible but elastically resilient plate, meet at a substantially similar height.

3. The sole according to claim 1, wherein cross-sections of the troughs of the trough-shaped elements are constricted by the edge strip.

4. The sole according to claim 1, wherein cross-sections of the lateral openings of the trough-shaped elements in the region of the edge strip are substantially trapezoidal.

5. The sole according to claim 1, wherein the bases of the trough-shaped elements are configured to be substantially flat.

6. The sole according to claim 1, wherein at least some of the plurality of trough-shaped elements are located on the medial part and an equal number of trough-shaped elements are located on the lateral part, and are aligned with one another in pairs in a transverse direction of the shoe.

7. The sole according to claim 6, wherein the plurality of trough-shaped elements are distributed substantially uniformly in the longitudinal direction of the shoe.

8. The sole according to claim 1, wherein a thickness of the trough-shaped elements decreases tendentially from the heel region to the ball region, and the thickness of at least the rearmost trough-shaped elements is thicker medially than laterally.

9. The sole according to claim 1, wherein a wall thickness of the trough-shaped elements decreases from the heel region to the ball region, the trough-shaped elements in the heel region are thicker on a front side than on the rear side, the trough-shaped elements in a metatarsal region are approximately the same thickness at the front and rear side, and the trough-shaped elements in the ball region are thinner on the front side than on the rear side.

10. The sole according to claim 1, wherein inner flanks of the trough-shaped elements are steeper in the heel region than in the ball region.

11. The sole according to claim 1, wherein inner flanks of the rearmost trough-shaped elements are at least partially inclined towards the rear of the shoe, when viewed from above.

12. The sole according to claim 1, wherein respectively outwardly directed front sides of the trough-shaped elements are provided with a plurality of superposed horizontal grooves.

13. The sole according to claim 1, wherein the longitudinal slot is bent.

14. The sole according to claim 1, wherein the longitudinal slot comprises a plurality of longitudinal sections which are laterally offset with respect to one another.

15. The sole according to claim 1, wherein the longitudinal slot comprises a plurality of longitudinal sections which are disposed at an angle with respect to one another, the trough-shaped elements in the heel region and in the metatarsal region are medially shorter than laterally, and the trough-shaped elements in the ball region are longer medially than laterally.

16. The sole according to claim 1, wherein the incompressible but elastically resilient plate is adhesively bonded to the midsole between the inner flanks of the trough-shaped elements in the heel region at a distance from the rear flanks, in the metatarsal region at a distance from the front and the rear flanks respectively, and in the ball region at a distance from the front flanks.

17. The sole according to claim 1, wherein the underside of the frontmost or rearmost trough-shaped elements includes a support made of a hard elastic material.

18. The sole according to claim 1, wherein the midsole is injection molded in one piece.

19. The sole according to claim 1, wherein the midsole is manufactured by joining together a lateral injection molded part and a medial injection molded part.

20. The sole according to claim 1, wherein the incompressible but elastically resilient plate includes a profiling which comprises longitudinal ribs on an upper side, transverse ribs and diagonal ribs on an underside, the underside comprising a structure complementary to the midsole.

21. The sole according to claim 20, wherein the structure complementary to the midsole includes notches.

\* \* \* \* \*